United States Patent
Langhans et al.

(10) Patent No.: US 7,836,602 B2
(45) Date of Patent: Nov. 23, 2010

(54) PROTECTIVE SHIELD FOR A TRIMMER

(75) Inventors: Klaus Langhans, Winnenden (DE); Josef Egger, Worgl (AT); Kai-Ulrich Machens, Stuttgart (DE); Marcus Stein, Glashutten-Schlossborn (DE); Markus Herzog, Weinstadt (DE); Dieter Kremsler, Spiegelberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 420 days.

(21) Appl. No.: 11/163,640

(22) Filed: Oct. 26, 2005

(65) Prior Publication Data

US 2006/0108128 A1    May 25, 2006

(30) Foreign Application Priority Data

Oct. 27, 2004    (DE) .................. 10 2004 052 235

(51) Int. Cl.
*B26B 7/00*    (2006.01)
(52) U.S. Cl. ........................................ 30/276
(58) Field of Classification Search ............. 30/276, 30/277.4, 286, 347, DIG. 5; 56/12.7, 320.1, 56/DIG. 20; D8/8
See application file for complete search history.

(56) References Cited

U.S. PATENT DOCUMENTS

| | | | | |
|---|---|---|---|---|
| 3,728,791 A * | 4/1973 | Holmquist | .................. | 30/294 |
| 3,831,274 A * | 8/1974 | Horrocks | .................. | 30/90.4 |
| 4,071,030 A * | 1/1978 | Hedrick | .................. | 30/276 |
| 4,209,902 A * | 7/1980 | Moore et al. | .................. | 30/276 |
| 4,550,499 A * | 11/1985 | Ruzicka | .................. | 30/276 |
| 4,630,371 A * | 12/1986 | Graham | .................. | 30/347 |
| 4,651,422 A * | 3/1987 | Everts | .................. | 30/347 |
| 4,864,728 A * | 9/1989 | Kloft et al. | .................. | 30/276 |
| 4,916,886 A * | 4/1990 | Nakamura et al. | ........... | 56/12.7 |
| 5,048,187 A * | 9/1991 | Ryan | .................. | 30/276 |
| 5,060,383 A * | 10/1991 | Ratkiewich | .................. | 30/276 |
| 5,077,898 A * | 1/1992 | Hartwig | .................. | 30/276 |
| D344,088 S * | 2/1994 | Tuggle et al. | .................. | D8/8 |
| 5,351,403 A | 10/1994 | Becker et al. | .................. | 30/276 |
| D357,616 S * | 4/1995 | Hintze | .................. | D8/8 |
| D382,779 S * | 8/1997 | Meisner et al. | .................. | D8/8 |
| D382,780 S * | 8/1997 | Meisner et al. | .................. | D8/8 |
| 6,571,477 B1 * | 6/2003 | Mothena et al. | .................. | 30/115 |
| 6,658,741 B2 * | 12/2003 | Paluszek | .................. | 30/276 |

(Continued)

FOREIGN PATENT DOCUMENTS

DE    102005045221 A1 *    5/2006

*Primary Examiner*—Jason Daniel Prone
(74) *Attorney, Agent, or Firm*—Gudrun E. Huckett

(57) ABSTRACT

A protective shield for a trimmer having a cutting head that is rotatable about an axis of rotation and supports a cutting thread that rotates about an axis of rotation with the cutting head and determines a cutting circle, covers at least partially the cutting circle. The protective cover has a base member and a cutting-to-length blade arranged on the base member so as to be positioned circumferentially relative to a cutting circle of the rotating cutting thread. The cutting-to-length blade has a cutting edge that, relative to the axis of rotation of the rotating cutting thread, is arranged in an axially displaced position displaced in an axial direction relative to the cutting circle. A device for axially deflecting the rotating cutting thread out of the cutting circle to the cutting edge is provided.

21 Claims, 3 Drawing Sheets

U.S. PATENT DOCUMENTS

| | | |
|---|---|---|
| 6,742,263 B2 * | 6/2004 | Ellson et al. .................. 30/276 |
| 7,406,771 B2 * | 8/2008 | Zimmermann et al. ........ 30/276 |
| 7,538,503 B2 * | 5/2009 | Machens et al. .............. 30/276 |
| D604,127 S * | 11/2009 | Houghton ....................... D8/8 |
| 2007/0074403 A1 * | 4/2007 | Robison ...................... 30/276 |
| 2009/0271992 A1 * | 11/2009 | Holter ......................... 30/276 |

* cited by examiner

PROTECTIVE SHIELD FOR A TRIMMER

This patent application claims priority of foreign German patent application number 10 2004 052 235.9 filed 27 Oct. 2004.

BACKGROUND OF THE INVENTION

The invention relates to a protective shield for a trimmer, whose cutting head, that is rotatable about an axis of rotation, supports a cutting thread that rotates in a rotational direction when the cutting head is rotated and then becomes aligned radially to the axis of rotation and determines a cutting circle that is at least partially covered by the protective shield. In the circumferential area of the cutting circle a cutting-to-length blade for the cutting thread is arranged on the protective shield.

Motor-driven brushcutters or trimmers of known configuration have a drive motor that is, for example, in the form of an internal combustion engine that drives a cutting head rotatable about an axis of rotation by means of a shaft supported in a guide tube. The cutting head supports a cutting thread that rotates in a rotational direction upon rotation of the cutting head and aligns itself approximately radially to the axis of rotation because of the occurring centrifugal forces. The rotational movement of the cutting thread determines a cutting circle. In the area of the cutting head, a protective shield is provided that covers the cutting circle of the cutting thread at least partially.

For mowing different plants such as grass or the like, the trimmer is aligned in the usual working position such that the cutting circle is positioned approximately parallel to the surface to be worked on. In the plane of the cutting circle, the rotating cutting thread cuts off the plants.

The cutting thread that is manufactured of flexible plastic material is subject to wear which primarily results in the cutting thread becoming shorter. From time to time, a manual or automatic adjustment of the cutting thread is required. For this purpose, the cutting thread is then moved out of a magazine provided on the cutting head in order to compensate the loss of length caused by wear. The length compensation is usually carried out so as to lead to an excess thread length. In order to prevent that a cutting circle that has too great a radius is generated, a cutting-to-length blade for cutting to length the cutting thread is arranged in the circumferential area of the cutting circle on the protective shield. During the first rotational movements following the length adjustment, the free end of the cutting thread having excess length impacts on the cutting edge of the cutting-to-length blade and is automatically cut to the predetermined length that should not be surpassed.

U.S. Pat. No. 5,531,403 discloses a trimmer having a protective shield with an integrated cutting-to-length blade. The cutting-to-length blade is arranged circumferentially relative to the cutting circle. Its cutting edge extends perpendicularly to the cutting circle and thus parallel to the axis of rotation of the cutting head. After automatic cutting to length of the cutting thread by means of the aforementioned cutting-to-length blade, the cutting thread has a free outer end that upon further trimmer operation is guided cyclically at high speed past the cutting edge of the cutting-to-length blade. In this area, an undesirably high noise development is observed.

SUMMARY OF THE INVENTION

It is an object of the present invention to further develop a protective shield for a trimmer of the aforementioned kind in such a way that the noise development is reduced while an effective cutting-to-length function for the cutting thread is provided.

In accordance with the present invention, this is achieved in that a cutting edge of the cutting-to-length blade, relative to the axis of rotation, is arranged vertically displaced in the axial direction relative to the cutting circle and in that means for axial deflecting the rotating cutting thread out of the cutting circle to the level of the cutting-to-length blade are provided.

Accordingly, a protective shield having a cutting-to-length blade is proposed for a trimmer wherein the cutting edge of the cutting-to-length blade relative to the axis of rotation is vertically displaced relative to the cutting circle in the axial direction. Moreover, means for axially deflecting the rotating cutting thread out of the cutting circle to the level of the cutting-to-length blade are proposed. For cutting to length the cutting thread having excess length, the thread is deflected, while in its rotational operating state, out of the cutting circle toward the cutting-to-length blade where, as a result of its rotational movement, it impacts on the cutting edge of the cutting-to-length blade. In the conventional configuration with two diametrically opposed cutting threads, a few half rotations suffice for cutting the cutting thread to the standard length. Subsequently, the cutting thread is returned into the usual cutting circle or cutting plane required for the proper cutting operation. Along the circumference of the cutting circle, the terminal portion of the cutting thread is positioned at an axial spacing to the cutting-to-length blade. It was found that this axial spacing reduces the generation of pressure waves when the cutting thread passes the cutting blade. While an effective cutting-to-length function is provided, the noise development is reduced.

Advantageously, the means for axial deflection are designed to function automatically for a cutting thread that has excess length. The mechanical or kinematic properties of the cutting thread having excess length deviate from those of a cutting thread having standard length, and the deviation in properties is utilized for an automatic cutting-to-length function. The operator is only required to replace the worn cutting thread or to pull the needed length of cutting thread from an integrated supply drum provided on the hub without having to pay particular attention to the length adjustment of the cutting thread. When subsequently starting up the trimmer, the cutting thread is cut to length automatically without the operator having to take any action. Operating errors are prevented.

In an advantageous further embodiment, at the circumference of the cutting circle a guide ramp for the free end of the cutting thread is provided that is oriented in the axial direction and rotational direction at a slant toward the cutting-to-length blade. For a length adjustment or compensation of the cutting thread, the cutting thread is adjusted to have excess length, as is conventional. When starting the trimmer, the cutting thread that begins to rotate contacts the guide ramp. The guide ramp that extends at a slant in the axial direction and rotational direction and points toward the cutting-to-length blade relative to the axial direction guides the free end of the cutting thread out of its cutting circle into a partial trajectory path that is displaced axially relative to the cutting circle. Along this trajectory path, the free end contacts the axially height-displaced cutting edge of the cutting-to-length blade so that the cutting thread is cut to length. The cutting thread that has now been shortened to the standard length no longer contacts the radially outwardly positioned guide ramp upon further rotational movement and continues to move within the predetermined cutting circle. Along the cutting circle, the terminal portion of the cutting thread is positioned at an axial spacing to the cutting blade. A simple configuration and an effective cutting-to-length function are provided and, at the same time, the noise development is reduced.

In an advantageous further embodiment, the protective shield has a supporting section that, in the conventional working position of the trimmer, is positioned on top and extends radially and is fixedly mounted on the trimmer. The cutting edge of the cutting-to-length blade is arranged above the cutting circle on a side of the protective shield adjacent the supporting section. During the cutting-to-length process, the free end of the cutting thread is deflected by means of the guide ramp relative to the axial or vertical direction upwardly into the protective shield. The cutting-to-length process is realized in a farther inwardly positioned area of the protective shield. The noise or sound development caused by the cutting thread impacting on the guide ramp and on the cutting edge of the cutting-to-length blade is effectively dampened by the protective shield.

In an expedient further embodiment, the guide ramp and the cutting edge of the cutting-to-length blade overlap one another in the axial direction at least partially across an axial range. In this way, it is ensured that the free end having excess length is lifted so far out of the cutting circle that it impacts across its entire cross-section on an effective cutting edge area. A clean and complete separation is ensured. In addition to its circumferential movement, the free end of the cutting thread also experiences an axial movement component. In this way, a slanted movement direction of the cutting thread is generated that for an appropriate orientation of the cutting-to-length blade leads to a slanted impacting on the cutting edge. The slanted impact improves the separating action and reduces at the same time also the noise development caused by the separating or cutting process.

An inner edge of the guide ramp is advantageously arranged at a radial spacing to the cutting edge of the cutting-to-length blade. After the cutting step, the freshly cut free end of the cutting thread moves on its cutting circle at exactly said radial spacing relative to the inner edge of the guide ramp. In operation, a spacing to the cutting blade as well as to the guide ramp is permanently provided. Noise development when the cutting thread passes the guide ramp is reduced.

The cutting edge of the cutting-to-length blade extends expediently in the rotational and axial directions at a slant to and in opposite direction to the guide ramp. Cutting edge and guide ramp are positioned in a V-shape relative to one another and generate a funneling effect for the excess portion of the cutting thread. In this way, a precisely defined cutting position is provided also. The slanted arrangement of the cutting edge improves the cutting result. For a slanted impact of the cutting thread, the noise development is minimal.

In an advantageous further embodiment, the cutting-to-length blade and/or the guide ramp are covered in the circumferential direction by the circumferential wall of the protective shield. The circumferential wall contributes to noise dampening during the cutting-to-length process and prevents the cut-off thread end from being thrown off.

In an expedient embodiment, the cutting-to-length blade and the guide ramp are formed by a monolithic cutting-to-length component, especially made of bent or shaped sheet steel. With the aid of simple manufacturing means, an arrangement is provided in which the guide ramp is permanently and precisely positionally secured relative to the cutting-to-length blade.

In an expedient embodiment, the cutting-to-length component has a central area that is mounted in a transition area of the supporting section passing into the circumferential wall and is shaped to closely follow (hug) the cross-sectional contour of the protective shield. In the transition area, the protective shield has increased shape stability that contributes to the position-precise securing of the cutting-to-length component. As a result of the shape that closely follows or hugs the protective shield, the protective shield and the cutting-to-length component support one another. At the same time, foreign matter swirled up during mowing is prevented from penetrating into intermediate spaces.

In an advantageous alternative, the means for axial deflection are designed for manual actuation by the operator. Preferably, the rotating cutting head with the cutting thread is movable in the axial direction toward the cutting-to-length blade in particular against the tension force of a pressure spring. The arrangement is of a constructively simple design. By simple placing or pushing the rotating cutting head onto the surface to be worked on, the operator can easily effect the axial deflection and thus the cutting-to-length function of the cutting thread. After lifting the cutting head off the ground, the cutting head is returned by the pretension of the pressure spring into the operating position. The cutting thread returns automatically into the predetermined cutting circle and is operated at reduced noise level as a result of its axial spacing to the cutting-to-length blade.

On the end face that is facing the surface to be worked on, the cutting head has expediently a glide shoe that in particular projects past a lower protective plane of the protective shield in the axial direction. When being placed onto the ground, the rotating cutting head glides on the glide shoe at defined conditions without being damaged. The downward projection of the glide shoe keeps the edge of the protective shield away from the ground.

DESCRIPTION OF THE PREFERRED EMBODIMENTS

Figure 1:
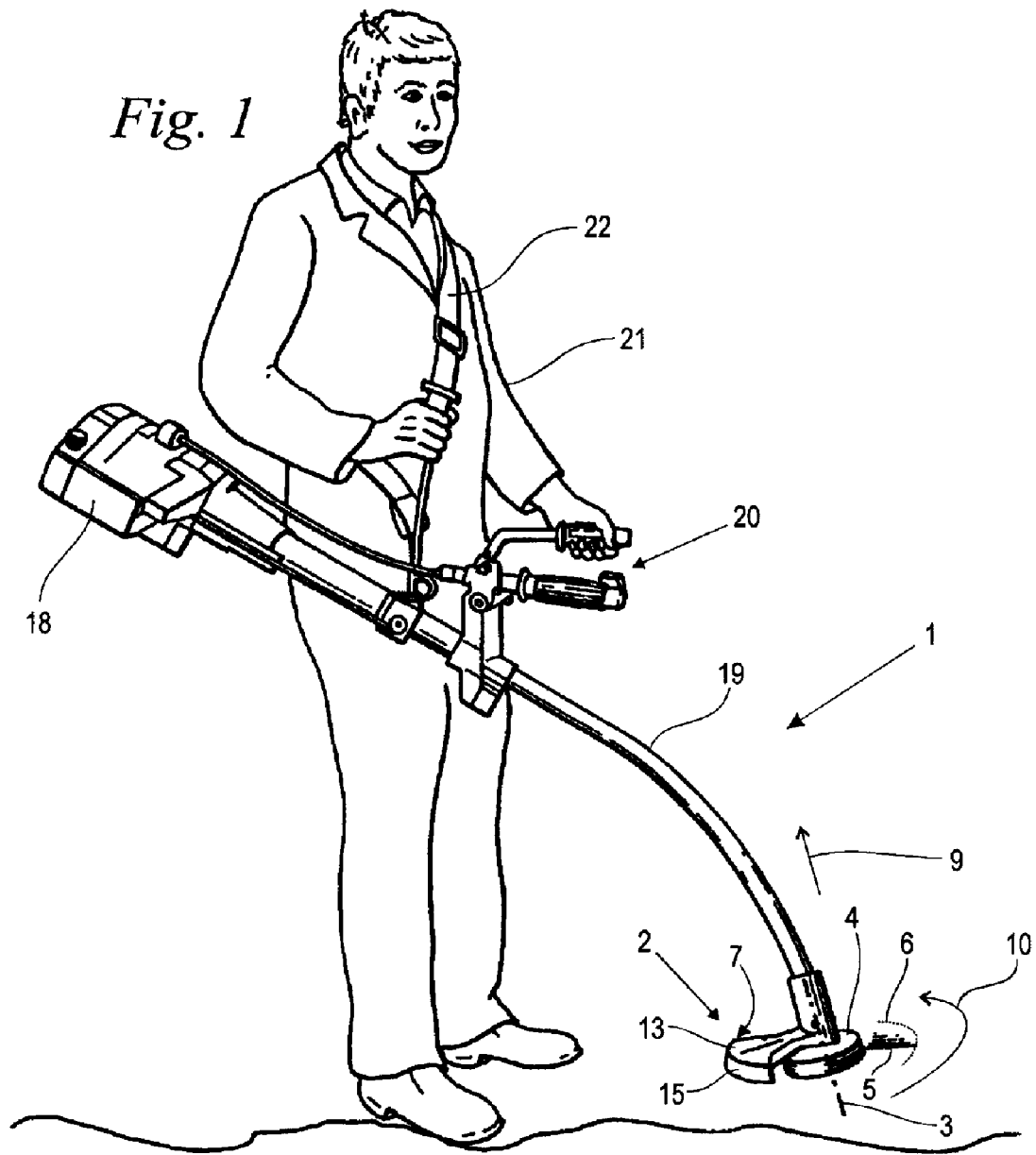
FIG. 1 is a general view of a trimmer in its usual operating position showing a protective shield with integrated cutting-to-length blade.

FIG. 1 shows in a general illustration an operator 21 carrying by means of a carrying strap 22 a trimmer 1 in its usual operating and working position. The trimmer 1 comprises a guide tube 19 having a motor unit 18 arranged at the first end and a cutting head 4 at its opposed second end. Within the guide tube 19 a drive shaft, not illustrated, is arranged by means of which the drive motor, also not illustrated, drives in rotation the cutting head 4. For guiding the trimmer 1 a grip unit 20 is provided on the guide tube 19; operating elements for controlling the drive motor are arranged on the grip unit 20.

The cutting head 4 supports a cutting thread 5 that in operation rotates together with the cutting head 4 about an axis of rotation 3 in a rotational direction indicated by arrow 10. The cutting thread 5 comprised of flexible plastic material will become aligned approximately radially to the axis of rotation 3 as a result of centrifugal forces caused by rotation and then circumscribes the cutting circle 6 that is indicated by dashed lines.

In the area of the cutting head 4, on the correlated end of the guide tube 19 a protective shield 2 is arranged that is fixedly mounted on the trimmer. The base member of the protective shield 2 comprises a support section 13 extending approximately radially to the axis of rotation 3; a circumferential wall 15, for example, similar to a cylinder section, is connected to the radially outer end of the support section 13 and is angled downwardly relative thereto.

In the illustrated usual working position of the trimmer 1, the axis of rotation 3 is positioned approximately vertically to the ground surface to be worked on so that the cutting circle 6 is positioned approximately parallel to the aforementioned surface. The axis of rotation 3 defines a vertical or axial direction that is positioned parallel thereto and indicated by arrow 9. The areal support section 13 covers the cutting circle 6 of the cutting thread 5 across an angular range upwardly toward the operator 21 in the axial direction 9. Across the same angular range, the cutting circle 6 is covered radially outwardly by the circumferential wall 15. The cutting-to-length blade 7 is attached on the protective shield 2 in the circumferential area of the cutting circle 6; the blade 7 is not illustrated in FIG. 1 but can be seen in more detail in FIGS. 2 and 3.

Figure 2:
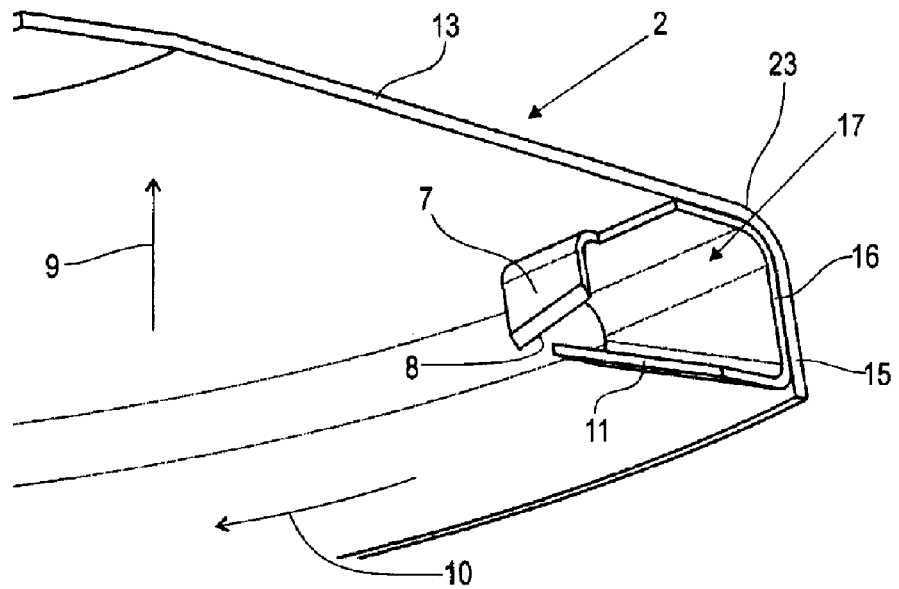
FIG. 2 is a perspective sectioned detail illustration of the protective shield of FIG. 1 in the area of the cutting-to-length blade with axially displaced cutting edge and a circumferential guide ramp.

FIG. 2 shows in a perspective sectioned detail view a first embodiment of the protective shield 2 of FIG. 1 in the area of the cutting-to-length blade 7. Means for axial deflection of the rotating cutting thread 5 out of the cutting circle 6 to the level of the cutting-to-length blade 7 are provided; the means are designed in the illustrated embodiment to operate automatically in the case of a cutting thread 5 having excess length. The aforementioned means comprise a cutting-to-length blade 7 as well as a guide ramp 11 that are formed as a monolithic cutting-to-length component 16 made of the bent or shaped sheet steel. In the illustrated cross-sectional view the support section 13 of the protective shield 2 has a rounded transition area 23 passing into the circumferential wall 15. The cutting-to-length component 16 has a central area 17 whose cross-section is shaped such that the central area 17 hugs without a gap the inner side of the protective shield 2 in the transition area 23 as well as the adjoining sections of the support section 13 and the circumferential wall 15. The cutting-to-length component 16, including the cutting-to-length blade 7 and the guide ramp 11, is completely covered circumferentially by the circumferential wall 15 of the protective shield 2. A two-part configuration of the cutting-to-length blade 7 and the guide ramp 11 can also be expedient.

The cutting-to-length blade 7 has a cutting edge 8 that, in the illustrated embodiment, is straight and extends at a flat angle at an incline to the rotational direction 10. The slanted arrangement of the cutting edge 8 is selected such that it extends downwardly in the rotational direction 10 opposite to the vertical direction indicated by arrow 9.

The guide ramp 11 is arranged to be oriented in the opposite direction. It extends in the circumferential direction 10 in a straight line and has an upwardly oriented directional component pointing in the direction of arrow 9. Viewed from a radial viewing angle, the cutting edge 8 and the guide ramp 11 extend in opposite directions relative to one another to form a V-shape or a funnel shape. They extend in the rotational direction 10 at an acute angle toward one another.

Figure 3:
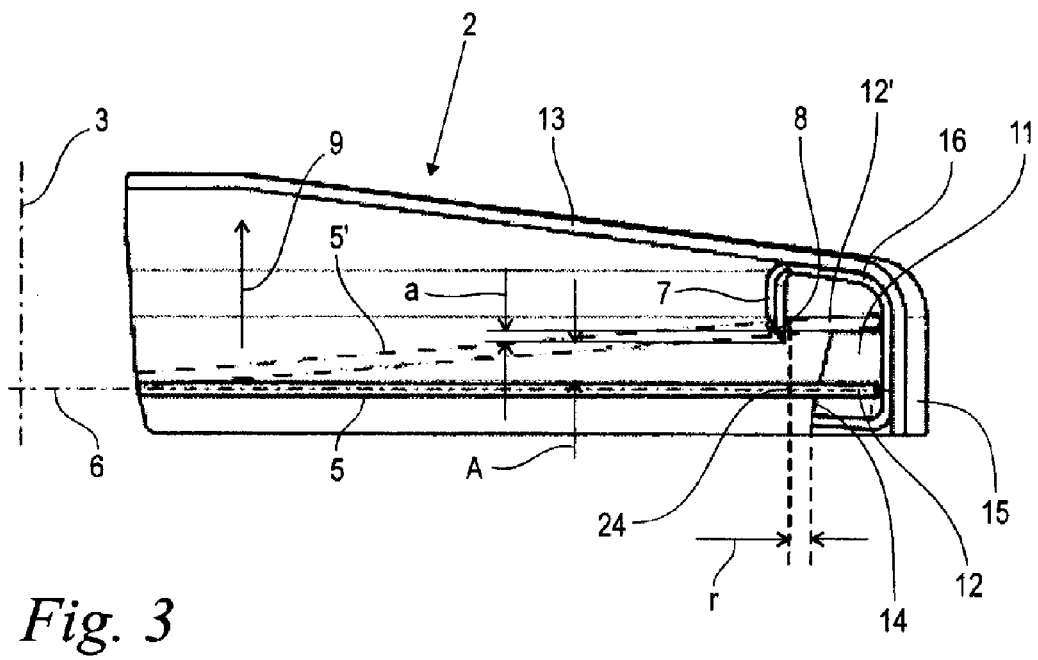
FIG. 3 is a cross-section in the radial direction of the protective shield of FIGS. 1 and 2 with details of the spatial arrangement of the cutting-to-length blade and the guide ramp relative to the cutting circle of the cutting thread.

The protective shield 2 according to FIGS. 1 and 2 is illustrated in radial section in FIG. 3. FIG. 3 shows that the cutting thread 5 for an unimpaired rotational movement about the axis of rotation 3 is aligned at a right angle and radially to the axis of rotation 3. Its rotational movement takes place on the plane cutting circle 6 that is positioned at a right angle to the axis of rotation 3.

Relative to the radial direction, the cutting thread 5 is illustrated with excess length and is positioned in radial overlap with the guide ramp 11. The guide ramp 11 that is areal and plane extends in the radial direction from an inner edge 14 to the circumferential wall 15 of the protective shield 2. In the axial direction 9 it extends from below the cutting circle 6 so far in the upward direction that it overlaps the cutting-to-length blade 7 and its cutting edge 8 across an axial area a.

In the illustrated radial section, the cutting edge 8 and the inner edge 14 of the guide ramp 11 extend parallel to one another as well as in the circumferential direction approximately parallel or like a secant to the circumferential wall 15 of the protective shield 2. The inner edge 14 of the guide ramp 11 is positioned at a radial spacing r outwardly relative to the cutting edge 8 of the cutting-to-length blade 7. The cutting-to-length blade 7 is displaced with its cutting edge 8 such in the axial direction 9 by an axial spacing A relative to the cutting circle 6 that the cutting edge 8 is arranged above the cutting circle 6 and positioned completely on the side of the cutting circle 6 facing the upper support section 13 of the protective shield 2. An arrangement underneath the cutting circle 6 may also be expedient.

When starting a rotational movement of the excess length cutting thread 5 about the axis of rotation 3, its free end 12 contacts the guide ramp 11 positioned circumferentially. Upon its further rotational movement, the free end 12 glides on the guide ramp 11 with an axial component in the direction of the arrow 9 upwardly until the cutting thread 5 has reached its deflected position 5' illustrated in dashed lines. The free end 12' of excess length that has been axially upwardly deflected is cut off by the cutting edge 8 of the cutting-to-length blade 7. After separation, the cutting thread 5 will begin to align again radially in the plane of the cutting circle 6. A shortened end 24 has been formed. Upon further rotation, the cutting thread 5 remains within the plane of the cutting circle 6. The shortened end 24 forms the radially outer limit of the cutting circle 6 that is constructively predetermined for the proper operation of the trimmer. As the shortened end 24 cyclically passes the cutting-to-length component 16, it maintains the radial spacing r relative to the inner edge 14 of the guide ramp 11. The shortened end 24 does not impact on the guide ramp 11 arranged circumferentially to the cutting circle 6. Accordingly, no further axial deflection of the cutting thread 5 occurs.

The illustrated trimmer can be operated with an internal combustion engine as a drive motor wherein preferably a single-cylinder two-stroke motor as well as a single-cylinder four-stroke motor can be used. It is also possible to employ an electric motor instead of an internal combustion engine.

Figure 4:
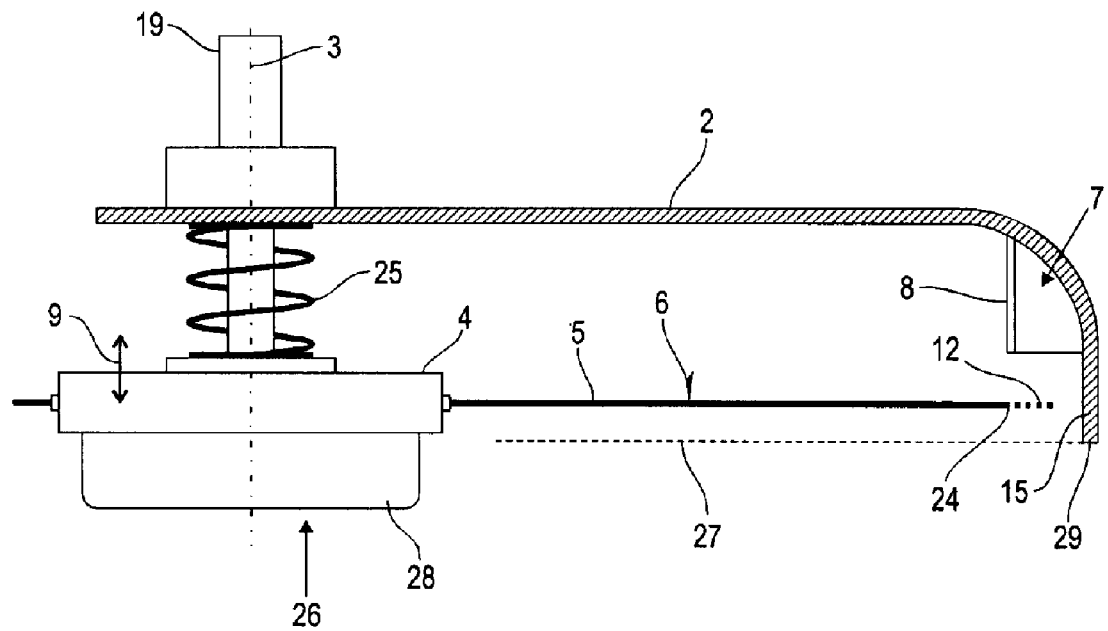
FIG. 4 is a schematic section illustration of a further embodiment with vertically displaced cutting-to-length blade and an axially height-adjustable cutting head in operating position.

FIG. 4 shows a schematic section illustration of a further embodiment having means for axial deflection of the rotating cutting thread 5 out of the cutting circle 6 to the level of the cutting-to-length blade 7. The means for axial deflection are provided for a manual actuation by the operator. For this purpose, in the illustrated embodiment the cutting head 4 is embodied to be movable together with the cutting thread 5 in the rotating operational state in the axial direction 9 relative to the guide tube 19 and the protective shield 2 attached thereto.

For this purpose, between the cutting head 4 and the protective shield 2 a pressure spring 25 is arranged that is a coil spring in the illustrated embodiment and is arranged coaxially to the axis of rotation 3. The cutting head 4 with the cutting thread 5 is illustrated relative to the axial displacement direction in its operating position in which the cutting thread 5 moves along the predetermined cutting circle 6.

The circumferential wall 15 covers in the radial direction outwardly the cutting thread 5 when moving within its cutting circle 6. It is extended past the plane of the cutting circle 6 in the downward direction where the protective shield 2 is open. A lower free edge 29 of the circumferential wall 15 is positioned below the plane of the cutting circle 6. The circumferential area of the edge 29, not illustrated in the drawing, spans a lower protective plane 27 of the protective shield 2 that is positioned approximately parallel to the plane of the cutting circle 6 and arranged underneath it.

The cutting head 4 has on its side 26 that is facing the surface to be worked on a glide shoe 28 that projects past the lower protective plane 27 of the protective shield 2 in the axial direction 9. For example, when placing the glide shoe 28 axially on the ground to be worked on, the glide shoe 28 glides rotatingly on the surface onto which it has been placed and forces thus the cutting head 4 against the tension of the pressure spring 25 in the axial direction 9 upwardly toward the guide tube 19. Relative to the vertical direction that is defined in this way, the cutting-to-length blade 7 is arranged in the circumferential area of the protective shield 2 above the plane of the cutting circle 6 wherein the cutting edge 8 of the cutting-to-length blade 7 extends approximately axis-parallel to the axis of rotation 3 or the axial direction 9. In the operating position illustrated in FIG. 4 of the cutting head 4, the cutting thread 5 can have excess length. A free end 12 that is illustrated in dashed lines and is to be cut off later is moved at axial spacing to the cutting-to-length blade 7 on a circular path.

Figure 5:
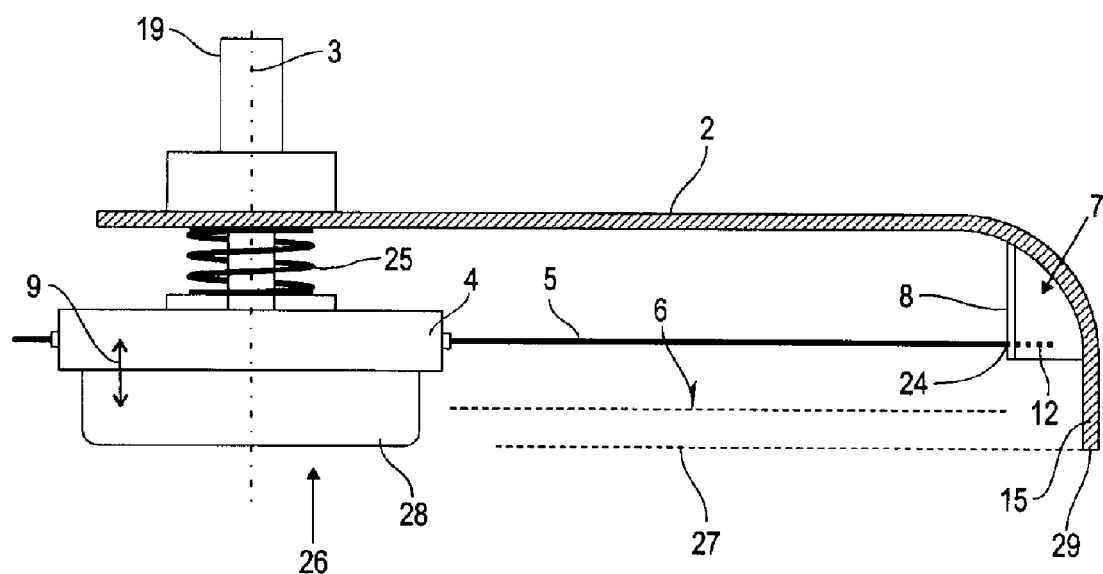
FIG. 5 shows the arrangement of FIG. 4 with the cutting head displaced in the vertical (axial) direction relative to the illustration of FIG. 4 showing its cutting-to-length position.

FIG. 5 shows the aforementioned arrangement in which the cutting head 4 together with the cutting thread 5, while being driven in rotation, is moved in the axial direction 9 out of the operating position illustrated in FIG. 4 into the cutting-to-length position according to FIG. 5. Same features of FIGS. 4 and 5 are identified with same reference numerals in order to facilitate a comparison of FIGS. 4 and 5. When comparing both Figures, axial pressure on the glide shoe 28, for example, when the operator briefly presses the trimmer onto the ground surface to be worked on, causes axial displacement into the cutting-to-length position illustrated in FIG. 5. In this connection, the cutting head 4 has such a position in proximity to the guide tube 19 that the movement path of the cutting thread 5 is now positioned above the cutting circle 6 and is in the area of the cutting edge 8 of the cutting-to-length blade 7. The free end 12 of excess length is cut off by the cutting edge 8 so that a shortened end 24 of the cutting thread 5 is produced having the predetermined length.

When lifting the glide shoe 28 off the ground, the pressure spring 25 automatically returns the rotating cutting head 4 together with the cutting thread 5 into the operating position illustrated in FIG. 4 where the shortened end 24 moves on the cutting circle 6 with axial spacing to the cutting-to-length blade 7.

While specific embodiments of the invention have been shown and described in detail to illustrate the inventive principles, it will be understood that the invention may be embodied otherwise without departing from such principles.

What is claimed is:

1. A protective shield for a trimmer having a cutting head that is rotatable about an axis of rotation and supports a cutting thread that rotates about the axis of rotation when the cutting head is rotated, wherein the rotating cutting thread is aligned radially to the axis of rotation and, when rotating unimpaired about the axis of rotation, the rotating cutting thread moves on a planar cutting circle that is positioned at a right angle relative to the axis of rotation, wherein the axis of rotation in a usual working position of the trimmer is positioned approximately vertically to a ground surface to be worked on and the planar cutting circle is positioned approximately parallel to the ground surface to be worked on, wherein the protective shield at least partially covers the cutting circle; the protective shield comprising:
   a base member;
   a cutting-to-length blade arranged on the base member so as to be positioned circumferentially relative to the planar cutting circle of the rotating cutting thread, wherein said planar cutting circle defines a radial plane having a radial top face and a radial bottom face wherein said radial bottom face faces in a first axial direction the ground surface to be worked on and said radial top face faces in a second axial direction, opposite to the first axial direction, away from the ground surface to be worked on;
   the cutting-to-length blade having a cutting edge;
   the cutting edge displaced in the second axial direction relative to said planar cutting circle and positioned at an axial spacing from said planar cutting circle such that the cutting edge is positioned completely above said radial top face in the second axial direction;
   means for axially deflecting in the second axial direction the rotating cutting thread out of said planar cutting circle toward the cutting edge.

2. The protective shield according to claim 1, wherein the means for axially deflecting automatically deflect the rotating cutting thread when the cutting thread has an excess length.

3. The protective shield according to claim 2, wherein the means for axially deflecting comprise a guide ramp arranged circumferentially relative to said cutting circle of the rotating cutting thread, wherein the guide ramp extends at a slant in a direction of rotation of the rotating cutting thread and relative to the axial direction toward the cutting edge.

4. The protective shield according to claim 3, wherein the base member comprises a radially extending support section that is adapted to be fixedly connected to a trimmer and in an operating position of the trimmer faces upwardly, wherein the cutting edge is positioned between the cutting circle and the support section.

5. The protective shield according to claim 3, wherein the guide ramp and the cutting edge partially overlap in the axial direction.

6. The protective shield according to claim 3, wherein the guide ramp has an inner edge and extends from the inner edge in a radial direction outwardly away from the axis of rotation, wherein the inner edge is positioned at a radial spacing radially outwardly relative to the cutting edge in the radial direction away from the axis of rotation.

7. The protective shield according to claim 3, wherein the cutting edge extends at a slant relative to the direction of rotation and the axial direction, wherein the slant of the cutting edge is oriented opposite to the slant of the guide ramp.

8. The protective shield according to claim 3, wherein the base member has a circumferential wall and the guide ramp is covered circumferentially by the circumferential wall.

9. The protective shield according to claim 3, wherein the cutting-to-length blade and the guide ramp together form a monolithic cutting-to-length component.

10. The protective shield according to claim 9, wherein the cutting-to-length component is composed of shaped sheet steel.

11. The protective shield according to claim 9, wherein the base member has a support section and a circumferential wall connected by a transition area, wherein the cutting-to-length component has a central area that is mounted in the transition area and is shaped to closely hug a cross-sectional contour of the base member.

12. The protective shield according to claim 11, wherein the cutting-to-length blade is circumferentially covered by a circumferential wall of the base member.

13. The protective shield according to claim 1, wherein the means for axially deflecting are configured to be manually actuated by an operator of the trimmer.

14. The protective shield according to claim 13, wherein the means for axially deflecting are adapted to allow movement of the rotating cutting head and the rotating cutting thread in the axial direction toward the cutting-to-length blade.

15. The protective shield according to claim 14, wherein the means for axially deflecting comprise a pressure spring having a pretension against which the rotating cutting head and the rotating cutting thread are moved.

16. The protective shield according to claim 14, wherein the means for axially deflecting comprise a glide shoe adapted to be connected to the cutting head on a side facing a ground to be worked on.

17. The protective shield according to claim 16, wherein the glide shoe projects axially downwardly past a lower protective plane of the protective shield facing the ground.

18. The protective shield according to claim 13, wherein the cutting-to-length blade is circumferentially covered by a circumferential wall of the base member.

19. The protective shield according to claim 1, wherein the means for axially deflecting are active when the cutting thread has an excess length.

20. The protective shield according to claim 1, wherein the cutting edge has a length that extends substantially in a rotational direction of the cutting thread.

21. A protective shield for a trimmer comprising a guide tube and a cutting head that is connected to an end of the guide tube and is rotatable about an axis of rotation and supports a cutting thread that rotates about the axis of rotation when the cutting head is rotated, wherein the rotating cutting thread is aligned radially to the axis of rotation and, when rotating unimpaired about the axis of rotation, the rotating cutting thread moves on a planar cutting circle that is positioned at a right angle relative to the axis of rotation, wherein the protective shield at least partially covers the cutting circle; the protective shield comprising:

a base member fixedly and stationarily mounted on the guide tube in a defined position relative to said planar cutting circle of the rotating cutting thread;

a cutting-to-length blade arranged on the base member so as to be positioned circumferentially relative to said planar cutting circle of the rotating cutting thread, wherein said planar cutting circle defines a radial plane having a radial top face and a radial bottom face wherein said radial bottom face faces in a first axial direction the guide tube and said radial top face faces in a second axial direction, opposite to the first axial direction, faces away from the guide tube;

the cutting-to-length blade having a cutting edge;

the cutting edge positioned at an axial spacing from said planar cutting circle in the second axial direction such that the cutting edge is positioned completely above said radial top face in the second axial direction;

means for axially deflecting in the second axial direction the rotating cutting thread out of said planar cutting circle toward the cutting edge.

\* \* \* \* \*